(12) United States Patent
Pitt et al.

(10) Patent No.: US 6,899,810 B1
(45) Date of Patent: May 31, 2005

(54) FLUID FILTERING DEVICE

(75) Inventors: Aldo M. Pitt, Wayland, MA (US); Sara D. Gutierrez, Danvers, MA (US); Thomas G. Zermani, Peabody, MA (US); Jeffrey Busnach, Billerica, MA (US); Joseph J. Raneri, Tewksbury, MA (US); James C. Groves, Gloucester, MA (US)

(73) Assignee: Millipore Corporation, Billerica, MA (US)

( * ) Notice: Subject to any disclaimer, the term of this patent is extended or adjusted under 35 U.S.C. 154(b) by 98 days.

(21) Appl. No.: 09/637,403

(22) Filed: Aug. 11, 2000

(51) Int. Cl.[7] .......................... B01D 63/08; B01D 63/16
(52) U.S. Cl. ............... 210/321.68; 210/324; 210/380.1; 422/101
(58) Field of Search ..................... 210/232, 321.68, 210/323.1, 360.1, 380.1, 455, 512.1, 321.75, 324; 422/101

(56) References Cited

U.S. PATENT DOCUMENTS

| | | | |
|---|---|---|---|
| 3,617,033 A | * 11/1971 | Ichikawa et al. | 261/21 |
| 3,653,562 A | * 4/1972 | Kronsbein | 223/76 |
| 4,119,539 A | * 10/1978 | Ettel et al. | 210/800 |
| 4,147,294 A | 4/1979 | Davidson et al. | 233/26 |
| 4,203,840 A | * 5/1980 | Stoeppler et al. | 210/787 |
| 4,449,964 A | 5/1984 | Westberg et al. | 494/16 |
| 4,632,761 A | 12/1986 | Bowers et al. | 210/650 |
| 4,722,792 A | 2/1988 | Miyagi et al. | 210/360.1 |
| 4,755,301 A | 7/1988 | Bowers | 210/650 |
| 4,769,145 A | 9/1988 | Nakajima | 210/321.75 |
| 4,941,867 A | 7/1990 | Tominaga | 494/16 |
| 5,045,207 A | 9/1991 | Fecondini et al. | 210/645 |
| 5,232,432 A | 8/1993 | Eberle | 494/16 |
| 5,647,990 A | 7/1997 | Vassarotti | 210/650 |
| 5,665,247 A | * 9/1997 | Valus et al. | 210/767 |
| 5,674,395 A | 10/1997 | Stankowski et al. | 210/321.75 |
| 6,017,454 A | 1/2000 | Hörl et al. | 310/321.68 |
| 6,054,325 A | 4/2000 | Kedar et al. | 436/178 |

FOREIGN PATENT DOCUMENTS

| | | |
|---|---|---|
| DE | 2201542 A | 4/1972 |
| EP | 0 569 115 A3 | 11/1993 |
| EP | 0 569 115 A2 | 11/1993 |
| FR | 2.156.519 | 6/1973 |
| SU | 425665 A | 10/1974 |
| WO | WO 94/27724 | 12/1994 |
| WO | WO 97/21484 | 6/1997 |
| WO | WO 98/26859 | 6/1998 |
| WO | WO 99/25470 | 5/1999 |
| WO | WO 00/35565 | 6/2000 |
| WO | WO 01/55727 A1 | 8/2001 |
| WO | WO 01/78895 A2 | 10/2001 |

OTHER PUBLICATIONS

"MultiScreen Assay System," (*Multiple sample filtration and assay system in 96–well format*) *Life Science Assays/Blotting Membranes*, p. 34, Millipore Corporation.

"*Centriprep Centrifugal Concentrators Operating Manual*", pp. 1–39, Amicon, Inc., 1996.

"*Microcon–96 Filtrate and Retentate Assemblies*" (Data Sheet), Millipore Corporation, 2000.

"Ultrafiltration Guide," *Centrifugal Filter Devices from Millipore Corporation, Millipore Corporation, 1998.*

"Centrifugal filter devices for concentrating and purfying proteins and nucleic acids," Millipore Corporation, 1999.

* cited by examiner

*Primary Examiner*—Ivars C. Cintins
(74) *Attorney, Agent, or Firm*—Hamilton, Brook, Smith & Reynolds, P.C.

(57) ABSTRACT

A fluid filtering device includes a plurality of filtering wells and an angling mechanism which adjusts the angle of the membranes within the filtering wells relative to a line of a centrifuge where the line is perpendicular to the axis of rotation of a centrifuge and passes through the center of a major plane of the filtering device. The angling mechanism can include a wedge located between the center of rotation of a centrifuge and a swinging bucket of the centrifuge. The angling mechanism can also be located within each filtering well and can provide individually specified angles for each membrane, relative to the line of the centrifuge.

38 Claims, 18 Drawing Sheets

FLUID FILTERING DEVICE

BACKGROUND OF THE INVENTION

Multiple well filtration plates such as ninety-six well plates containing the standard eight by twelve array are commonly used to filter fluids using either vacuum or centrifugal force for a variety of applications. Ultrafiltration membranes typically require more force than generated by vacuum to filter a fluid and have to be run using centrifugation or pressure. Centrifuges adapted with rotors and carriers for the ninety-six well microtiter plates are very common laboratory equipment and therefore frequently used to generate the forces required to drive filtration. Viscous, high protein containing serum or plasma is one of the fluids requiring ultrafiltration. In one application, protein free filtrate from serum is required for drug analysis while in another protein-bound drug is conveniently separated from the free drug. This is a critically important determination of how much drug is free and, therefore, available to enter the targeted tissues or organs. The ultrafiltration membrane is a very effective means to remove the high molecular weight material from the small molecules (e.g. drugs) typically being analyzed. These types of experiments are performed in pharmaceutical and biotechnology companies as part of the secondary characterization or ADME/tox. Serum and plasma represents one of the more difficult fluids to ultrafilter and commonly utilizes the forces generated by a centrifuge to produce the "protein-free" filtrate required for analysis. When serum is separated using both centrifugation and ultrafiltration a characteristic filtrate volume pattern is observed. We have called this the "smile effect" and is shown in FIG. 1.

Many of the centrifuge rotors that are used for multi-well plates are swinging buckets. When filtering fluids, multiple well centrifugal filtration devices are spun with all membranes of the well plates in the same plane. All multi-well plates are centrifuged with the center of the major plane of the filter perpendicular to a swing radius vector of the centrifuge. Filtrations of some, especially viscous samples, (e.g. serum or plasma) can take a long time to collect even a minimum filtrate volume. On the other hand, the volume of the filtrate is not homogeneously distributed through the plate. Generally, outer wells of the plate have more filtrate volume and the inner rows of the plate have the least amount of filtrate, thereby causing an uneven filtrate distribution or "smile effect", as shown in FIG. 1. It is known that the filtration of proteins such as serum result in reduced filtration rates known as concentration polarization or fouling which is caused by forcing these large biomolecules on the active membrane surface. This effect also occurs in swinging bucket rotors since there is no control in the concentration polarization of the membrane.

Therefore, a need exists for an apparatus and method to form a more uniform distribution of filtrate volume in all the wells in addition to controlling the polarization and creating a faster filtration rate.

SUMMARY OF THE INVENTION

The present invention relates to a fluid filtering device having a centrifuge and a plurality of filtering wells within a plate placed in the centrifuge, wherein each filtering well includes a membrane for filtering a fluid. An angling mechanism can adjust the angle of the plate to a non 90° angle relative to a line wherein the line is perpendicular to the axis of rotation of the centrifuge and passes through the center of a major plane of the plate. The angle controls the force vector tangential to the membrane. The angling mechanism can include a support device which holds the membrane at an angle relative to the line. This angling mechanism can include a wedge. The angling mechanism can be placed between the center of rotation of the centrifuge and the base of a swinging bucket and can adjust the top-to-bottom orientation of the membrane, the side-to-side orientation of the membrane or the top-to-bottom and the side-to-side orientation of the membrane relative to the line. The filtering wells can be located in an array in a single plane or in the same plane.

Each of the wells can include an angling mechanism. Each angling mechanism in each well can have an individually specified angle relative to the line. This angle can adjust the fluid flow rate filtered through the membranes for each well. The membranes can be at a non 90° angle relative to the line at rest. The angle can be formed within a range of 85° and 60° relative to the line or can be formed within a range of 88° to 60° relative to the line. The membrane can be made from either a microfiltration membrane or an ultrafiltration membrane. The wells can be arranged to form rows and columns. The angles of the membranes within a row can be substantially the same.

The invention also relates to a centrifuge having a housing, a rotating mechanism within the housing, wherein the rotating mechanism includes a swinging bucket, and a fluid filtering device which include fluid filtering wells having a membrane and an angling mechanism where the fluid filtering device is placed within the rotating mechanism. The angling mechanism includes a support device to hold the plane of the membrane at a non 90° angle relative to the line of the centrifuge. The angle of the angling mechanism can be in a range between 5° and 30° or can be within a range of 2° to 30°. The angling mechanism can set the angle of the membranes in a range between 88° and 60° relative to the line. Such an angling mechanism can include a wedge.

The angling mechanism can be placed between the center of rotation of the device and the swinging bucket in the centrifuge and can adjust the top-to-bottom orientation, the side-to-side orientation or both the top-to-bottom and the side-to-side orientation of the membrane relative to the line. Alternately, each of the plurality of wells can include the angling mechanism. Each angling mechanism can include an individually specified angle relative to the line. The filtration membrane can include either a microporous or an ultrafiltration membrane.

The swinging bucket of the centrifuge can include a counterweight to prevent over rotation or control the pivot angle of the swinging bucket during centrifugation. The centrifuge can also include a "stop" to control the pivot angle of the swinging bucket during centrifugation. The centrifuge can also include a support assembly to hold the fluid filtering device at a fixed angle relative to the line of the centrifuge.

The invention also relates to a fluid filtering device having a plurality of wells placed in the centrifuge where each well includes a membrane for filtering a fluid, where the membranes are at a non 90° angle relative to a line at rest and non-parallel to the major plane of the plate. The line is perpendicular to the axis of rotation of the centrifuge and passes through the center of a major plane of the plate. The angle relative to the line can adjust the top-to-bottom orientation, the side-to-side orientation or both the top-to-bottom and side-to-side orientation of the membrane relative to the line. The filtering wells can be located in an array in the same plane. Each membrane in each well can include an individually specified angle relative to a major plane of the plate. This angle can be between approximately 3° to 30° relative to the major plane of the plate or can be between 2° and 30° relative to the major plane of the plate. The membrane can include either a micro filtration or an ultra-filtration membrane.

A fluid filtering device also includes a plurality of filtering wells within a plate, where each well has a membrane for filtering a fluid, and an angling mechanism where the angling mechanism sets the angle of the membranes within the plurality of filtering wells at a non 90° angle relative to a line where the line is perpendicular to an axis of rotation of a centrifuge and passes through the center of a major plane of the plate. Alternately, the filtering device has a plurality of wells within a plate, each well having a membrane, and angling mechanism which sets the angle of one or more of the membranes at a non-zero angle relative to the plane of the plate. For either filtering device, the angling mechanism can include a support to set the membrane at an angle relative to the line or the plate and can also include a wedge. For either filtering device, the angle of the membranes can be adjusted in a top-to-bottom orientation, a side-to-side orientation or both a top-to-bottom and a side-to-side orientation relative to the line or the plate, respectively. The filtering wells can be located in the same plane and each membrane in each well can include an individually specified angle relative to the plane of the plate.

The present fluid filtering device has an advantage in that it can increase average volume filtered during centrifugation and the filtrate volume is substantially uniform with little well-to-well filtrate volume variability, thereby minimizing a "smile effect" as compared to a flat plate with all wells in the same orientation from the plane of the flat plate and that the plane of the flat plate is normal to the swing radius vector.

Using an angling mechanism can increase the average filtrate flow rate among a plurality of wells in a filtration well plate. This can be accomplished by angling the membranes of the wells at an angle relative to a line in a centrifuge or by angling the plate relative to a line in a centrifuge.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 2:
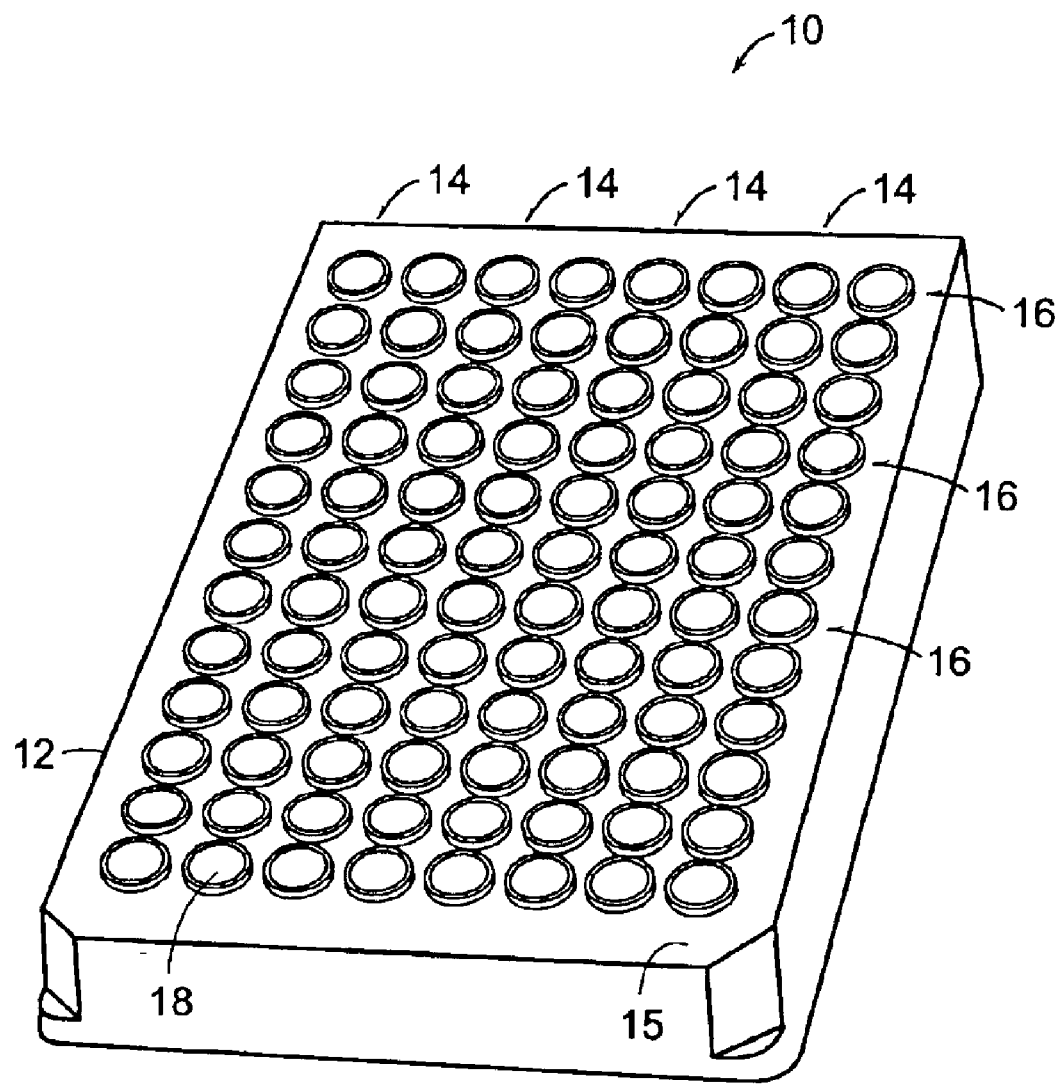
FIG. 2 illustrates a multi-well filtration plate.
Figure 3:
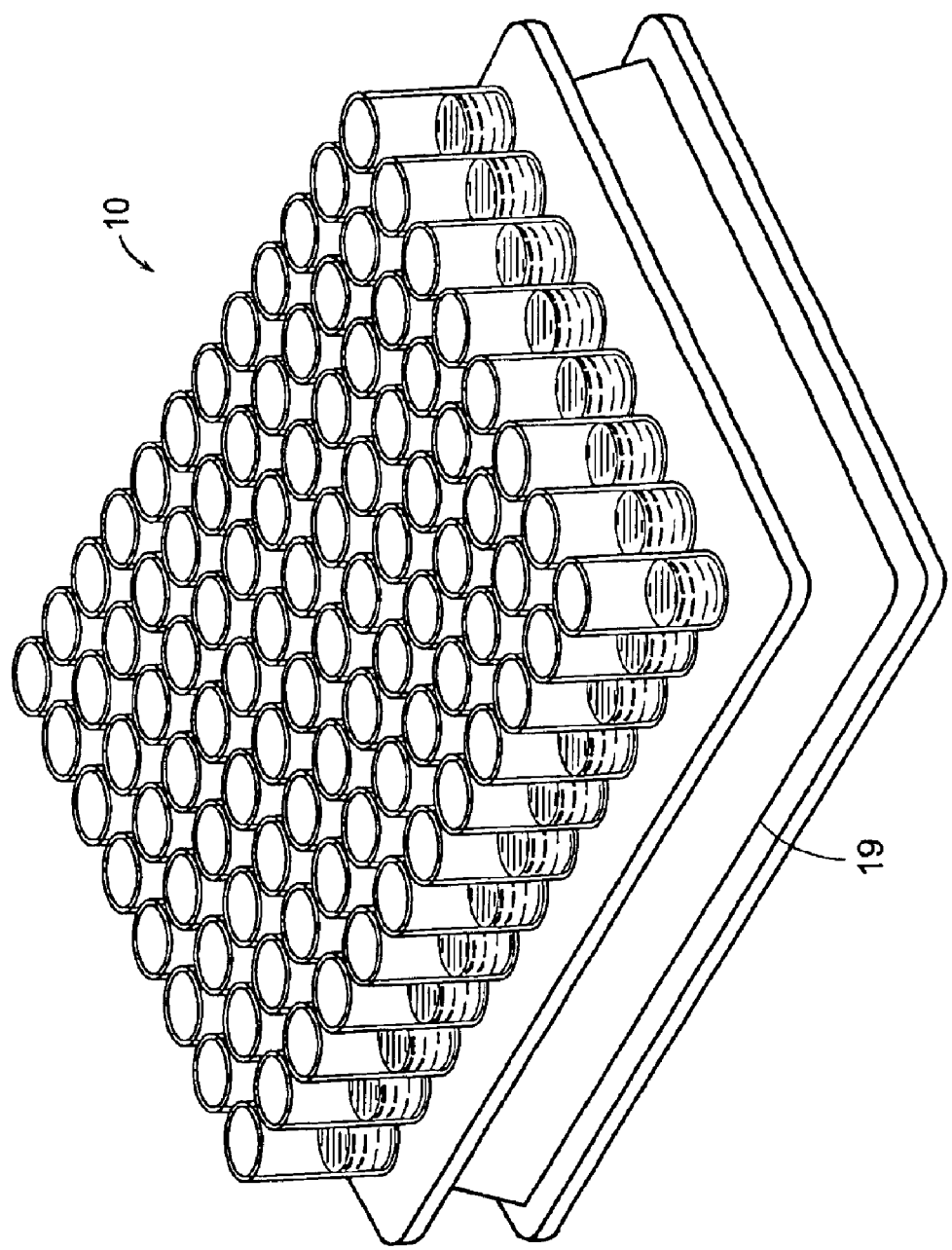
FIG. 3 illustrates another embodiment of a ninety-six well filtration plate and a filtrate collection plate.

FIG. 2 illustrates a filtration well plate given generally as 10. The filtration well plate 10 has a housing 12 containing a plurality of wells 18. Typically, 2, 6, 8, 12, 24, 48, 96 or 384 wells are in each plate 10. The wells 18 can form an array having rows 14 and columns 16. In a 96 well plate, the rows 14 of wells 18 can have a total of eight rows, labeled A–H, and the columns 16 of wells 18 can have a total of twelve columns, labeled 1–12. A filtration well plate having these dimensions provides a total of ninety-six individual wells 18 which can form an array within a single plane. The face of the well plate 10 forms a major plane 15 of the plate 10. The filtration well plate 10 is positioned on top of a collection well plate 19, which allows collection of a filtered fluid, as shown in FIG. 3.

Figure 4:
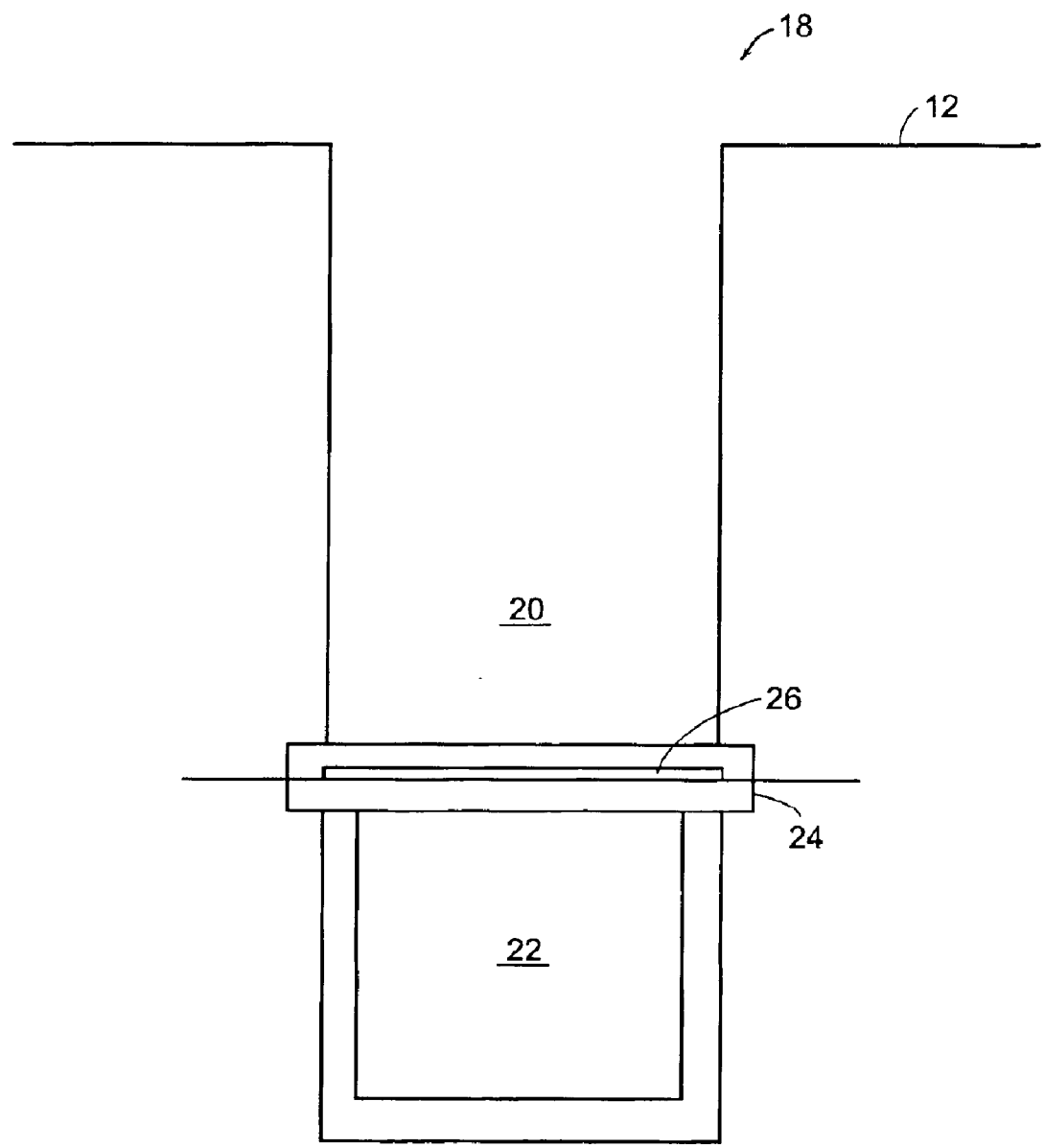
FIG. 4 shows a cross-sectional schematic view of a single filtration well.

FIG. 4 illustrates a single well 18. The well 18 includes a storage chamber 20 on top of a filtrate collection chamber 22. A connector 24 can be located between the storage chamber 20 and the filtrate collection chamber 22 to allow for secure attachment between the chambers 20, 22. Fluid to be filtered is placed in the storage chamber 20 and filters through a membrane 26 into the collection chamber 22. The membrane 26 can be a microfiltration membrane, or an ultrafiltration membrane or a Microcon® holder plate available from Millipore Corporation, Bedford, Mass.

To perform a filtration, fluid is placed within the storage chambers 20 of the wells 18 of a filtration well plate 10. The well plate 10 is then placed flat within a swinging bucket in a centrifuge. As the centrifuge rotates, the swinging bucket and well plate about a center of rotation, the swinging bucket alters its position such that the base of the bucket and the well plate 10 are parallel to the housing wall of the centrifuge and such that the plane 15 of the flat or non-angled plate 10 is perpendicular to a line which is perpendicular to the axis of rotation of the centrifuge. The gravitational force (g-force) generated by the centrifuge during rotation of the swinging bucket forces fluid within the wells 18 through the membrane 26 and into collection chamber 22.

Figure 5:
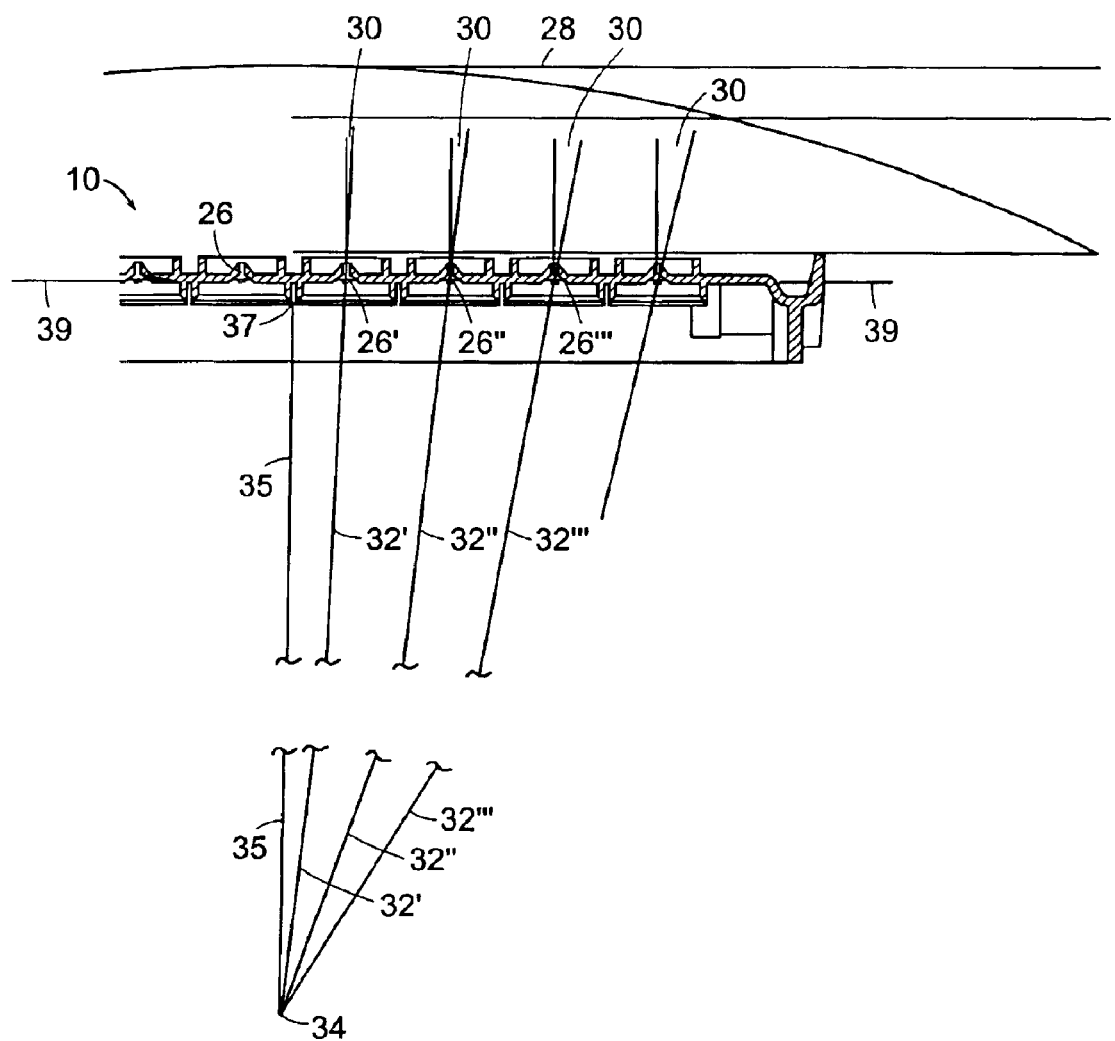
FIG. 5 shows a filtration well plate placed flat within a swinging bucket in a centrifuge.

FIG. 5 illustrates a top view of a filtration well plate 10 as typically located inside a centrifuge, during rotation. The filtration well plate 10 rests flat against a swinging bucket 28 in the centrifuge. Each well location has a different swing radius vector relative to the center of rotation 34. For example, membrane 26' is located a distance corresponding to swing radius vector 32' away from the center of rotation 34. Similar relations exist for membranes 26" and 26''' and swing radius vectors 32" and 32''', respectively. The normal to each membrane 26', 26", 26''' forms an angle 30 with each respective swing radius vector 32', 32", 32'''. When the well plate 10 is placed flat within a swinging bucket, the angle 30 formed increases for wells more distant from the center 37 of the plate. As described, the centrifuge can also have a line 35 located between the axis of rotation 34 of the centrifuge and the center 37 of the plane 39 of the plate 10 where the line is perpendicular to the axis of rotation of the centrifuge. In this embodiment, plane 39 extends through the center points of the membranes. When the plate 10 is placed flat within the swinging bucket, and during a centrifugation procedure, the plane 15 of the plate forms a 90° angle with the line 35.

Figure 6:
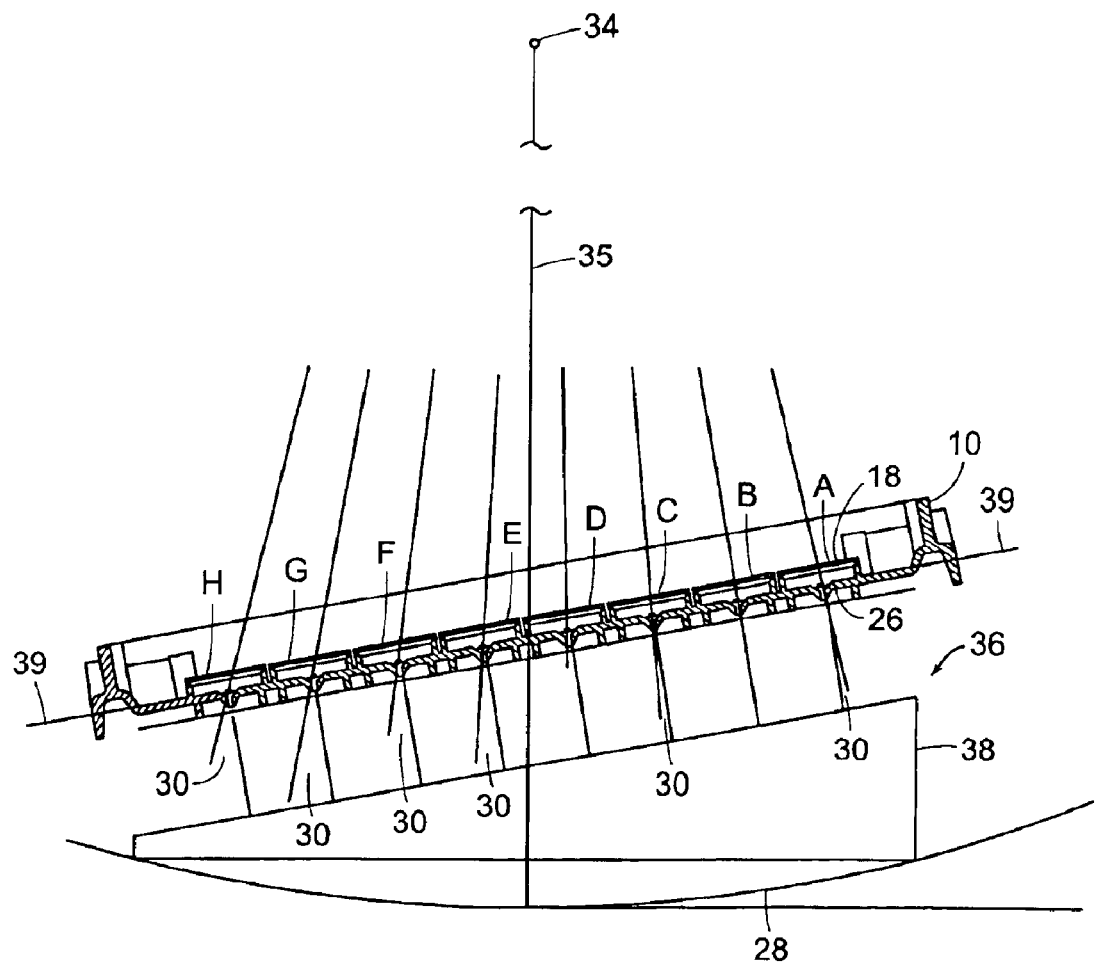
FIG. 6 illustrates a filtration well plate placed at an angle within a swinging bucket in a centrifuge.

FIG. 6 shows a filtration well plate 10 placed in a swinging bucket 28 with an angling mechanism 36. The angling mechanism 36 can include a support device to hold the membranes 26 at an angle relative to the line 35. The angling mechanism 36 can include a wedge 38. The angling mechanism 36 adjusts the angle of each membrane 26 within each of the plurality of wells 18 to form a non 90° angle with respect to the line 35.

Figure 1:
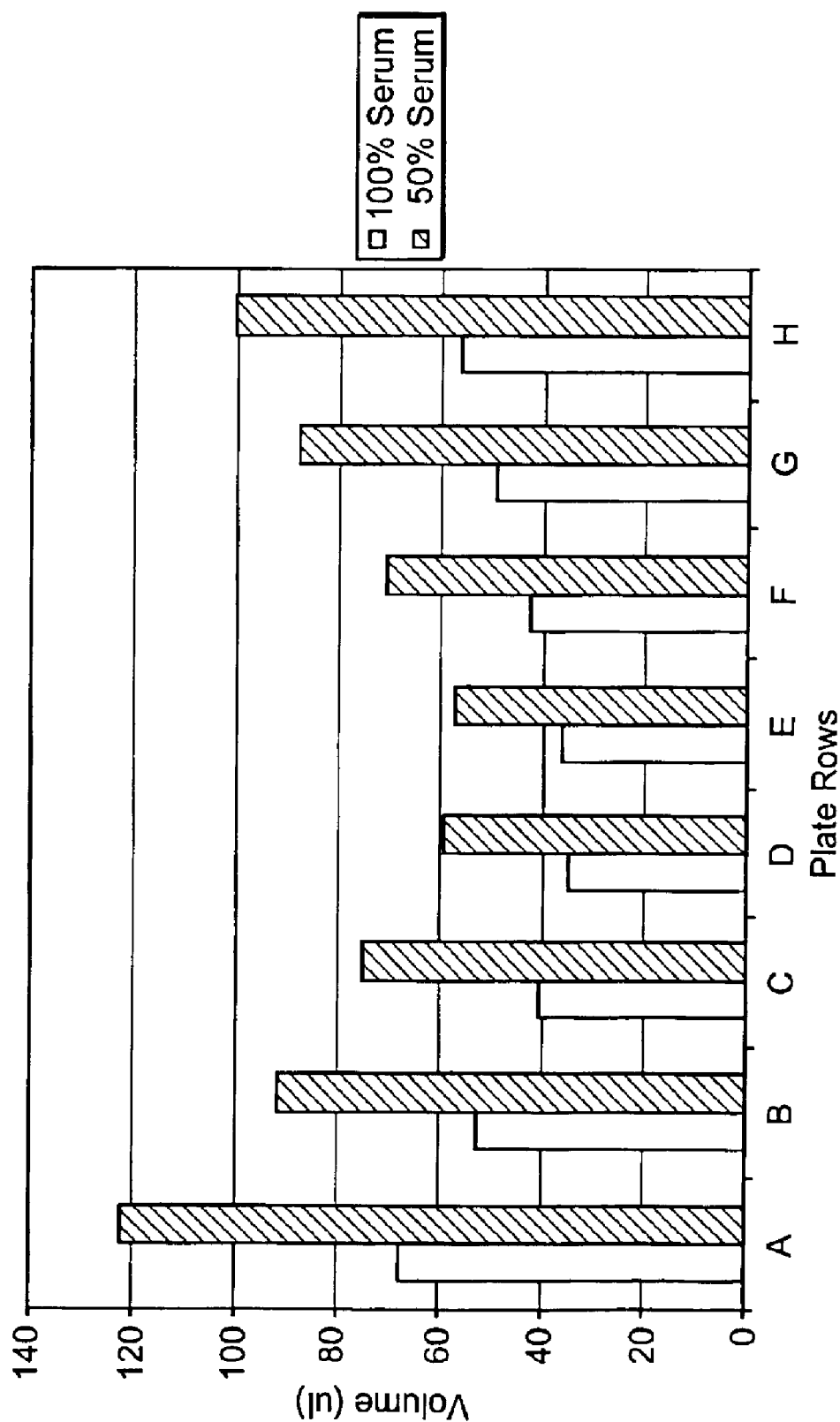
FIG. 1 illustrates a pattern of volumes of a fluid filtered, such as serum, using a flat plate in a centrifuge.
Figure 7:
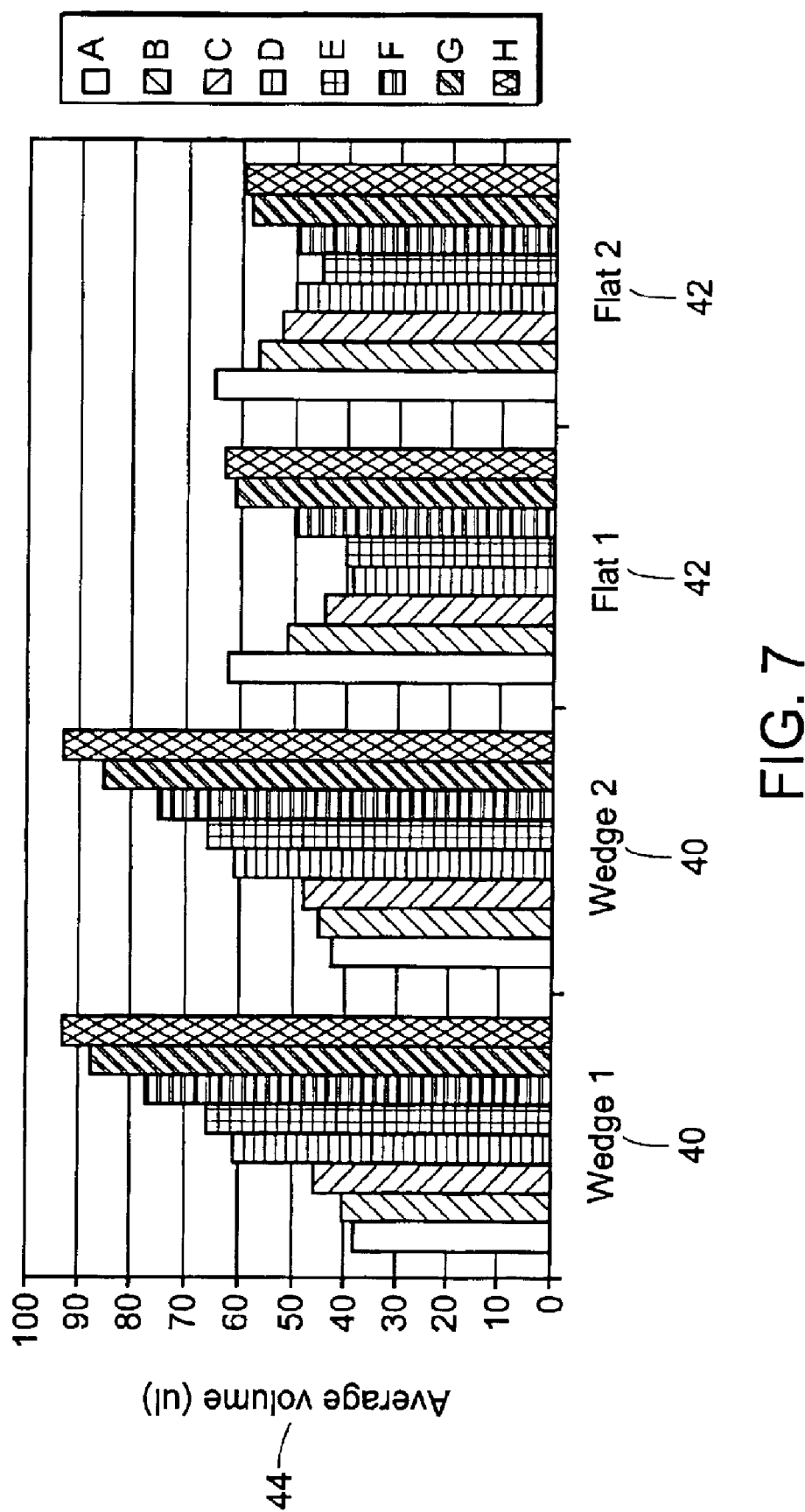
FIG. 7 shows the average filtration volume by row of a filtration well plate for both an angled and non-angled plate.
Figure 8:
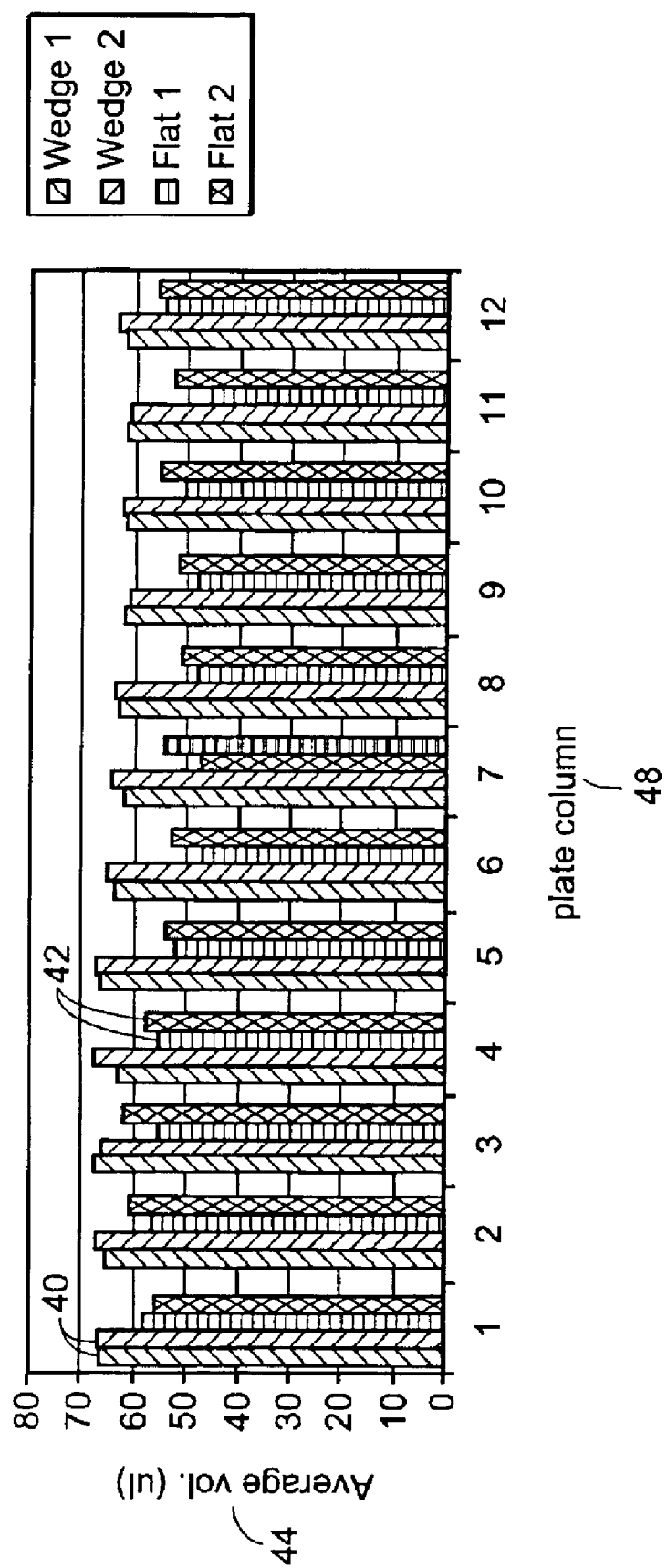
FIG. 8 illustrates the average filtration volume by column of a filtration well plate for both an angled and non-angled plate.

Filtrate rate minimum values are determined when the plate 10 is placed flat within a swinging bucket and the plane 15 of the plate 10 is perpendicular to the line 35, as shown in FIG. 7 and identified as Flat 1 and Flat 2. The minimum filtrate values for serum are illustrated in FIG. 1, rows E and D. Placing the filtration well plate 10 at an angle with respect to the line 35 can increase the average flux of material filtered by the membrane 26 as compared to the flat plate. An increase of flux allows a user to reduce the amount of time needed to filter a fluid, obtain more filtrate volume per well, and reduce the amount of force generated by the centrifuge during a filtering operation. Use of an angling mechanism 36 can also reduce the well-to-well filtrate volume variability found in use of non-angled filtration wells 10. The angling mechanism 36 can adjust the angle of the membrane to a non 90° angle relative to the line 35. Preferably, the membranes form an angle between 85° and 60° relative to the line 35. The membranes can form an angle between 88° and 60° relative to the line 35. The angles formed relative to the line 35 have a tolerance of +/−one degree. The average volume of serum filtered by row and by column for the angled filtration plate of FIG. 6 is shown in FIGS. 7 and 8, with rows A–H in FIG. 6 corresponding to rows A–H in FIGS. 7 and 8.

FIG. 7 illustrates a graph showing the average volume of material filtered such as, for example, serum, by a filtration well plate 10 by row when the plate 10 is placed either flat within a swinging bucket or with an angling mechanism within a swinging bucket in a centrifuge. Filtration well plates 10 placed flat 42 within the swinging buckets of a centrifuge show a "smile effect" of the volume of fluid filtered. In the "smile effect," the wells 18 on the end rows, such as rows A and B and rows G and H of the filtration well plates 10 show a greater average volume of fluid filtered, compared to the rows located toward the center of the filtration plate 10, such as rows D, E and F which show a lesser average volume of fluid filtered. Such a distribution produces a pattern which is similar to the shape of a smile. Filtration well plates 10 placed at an angle 40 within the swinging buckets of the centrifuge show an average increased volume 44 of fluid filtered towards the end rows of the wells, such as rows D–H, that are angled towards the center of rotation of the centrifuge. The angling mechanism 36 can skew the "smile effect" toward the filtration wells 18 angled toward the center of rotation of the centrifuge.

Table 1 illustrates, as an example, the average volume of filtrate collected by row for 96 well filtration plates placed both flat within a centrifuge and at an angle within a centrifuge. The table also lists the swing radius vector for each row in both the wedged and flat plates. The angles listed in Table 1 refer to the angle of the wedges with respect to the base of the bucket.

TABLE 1

Average Volume of Filtrate Collected

| | Wedge | | | Flat | | |
|---|---|---|---|---|---|---|
| Row | Swing Radius Vector (in) | Angle (degrees) | Average Volume (μl) | Swing Radius Vector (in) | Angle (degrees) | Average Volume (μl) |
| A | 5.0197 | 3.519 | 40.40 | 5.6022 | 12.799 | 64.04 |
| B | 5.0104 | 0.532 | 42.72 | 5.5345 | 9.217 | 54.11 |
| C | 5.0262 | 4.577 | 46.54 | 5.4888 | 5.561 | 48.07 |
| D | 5.0669 | 8.578 | 61.27 | 5.4659 | 1.859 | 44.13 |
| E | 5.1318 | 12.496 | 66.05 | 5.4659 | 1.859 | 42.91 |
| F | 5.2200 | 16.298 | 76.25 | 5.4888 | 5.561 | 49.57 |
| G | 5.3304 | 19.959 | 86.39 | 5.5345 | 9.217 | 60.03 |
| H | 5.4616 | 23.458 | 93.10 | 5.6022 | 12.799 | 61.98 |

Table 2 shows an example of the total average volume of filtrate accumulated by both a flat and a wedged plate. On average, the wedged plate collected a greater overall amount of filtrate volume than did a flat plate.

TABLE 2

Total Average Volume of Filtrate

| | Total Average (μl) | Lowest Value in Plate (μl) | Low Average in Plate (μl) | Highest Value in Plate (μl) | High Average in Plate (μl) |
|---|---|---|---|---|---|
| Wedge 1 | 63.61 | 26.46 | 37.97 | 96.85 | 92.95 |
| Wedge 2 | 64.57 | 38.24 | 42.83 | 94.73 | 93.24 |
| Flat 1 | 51.18 | 14.94 | 38.61 | 72.13 | 63.25 |
| Flat 2 | 55.02 | 35.89 | 45.44 | 70.02 | 65.74 |

FIG. 8 illustrates the average volume 44 of fluid filtered by filtering wells 18 placed either flat against the swinging bucket of the centrifuge or at an angle in the swinging bucket of the centrifuge in a 96 well plate. When filtration well plates 10 angled 40 within the centrifuge, the average volume 44 of fluid filtered through a membrane 26 is greater than the average amount of fluid filtered by the membrane when the filtration well plates 10 are placed flat 42 within the centrifuge. For plate columns 48, of which there are twelve, the filtration wells 18 placed at an angle show a greater amount of average fluid volume filtered than wells 18 which were placed in the centrifuge flat against the swinging bucket.

Figure 9:
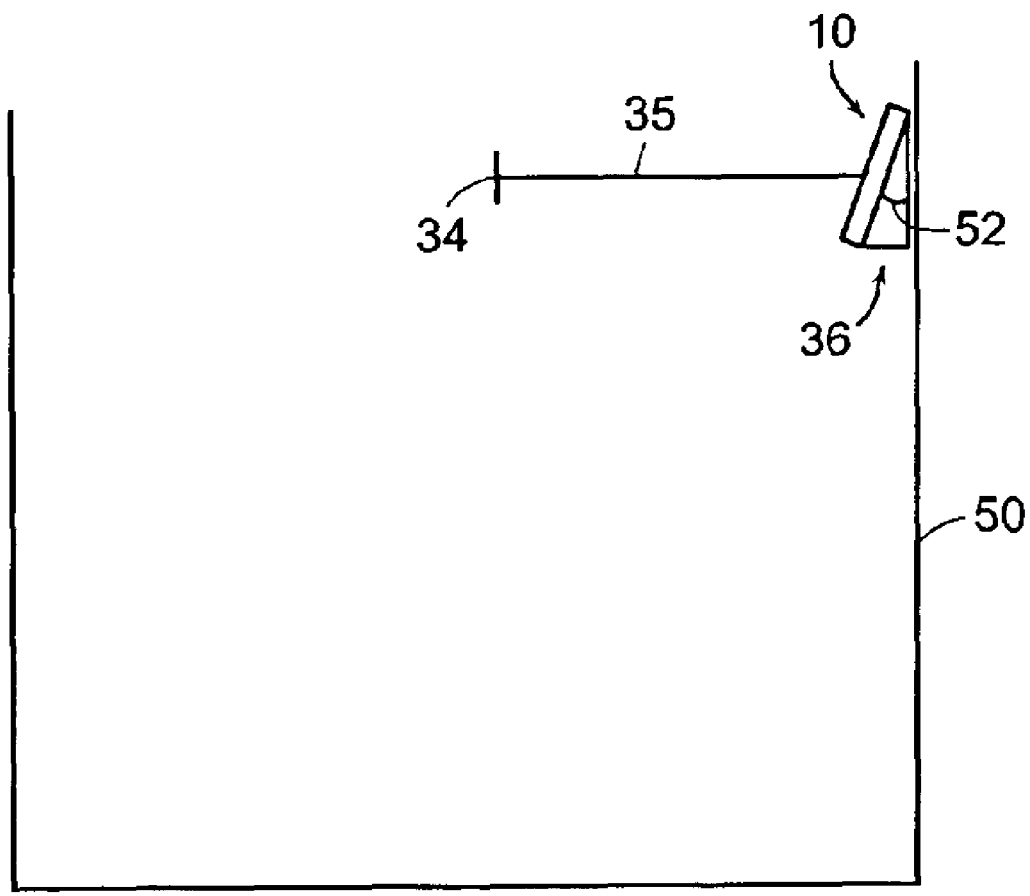
FIG. 9 illustrates a schematic side view of a centrifuge having a filtration well placed at a top to bottom angle relative to the line of the centrifuge.
Figure 10:
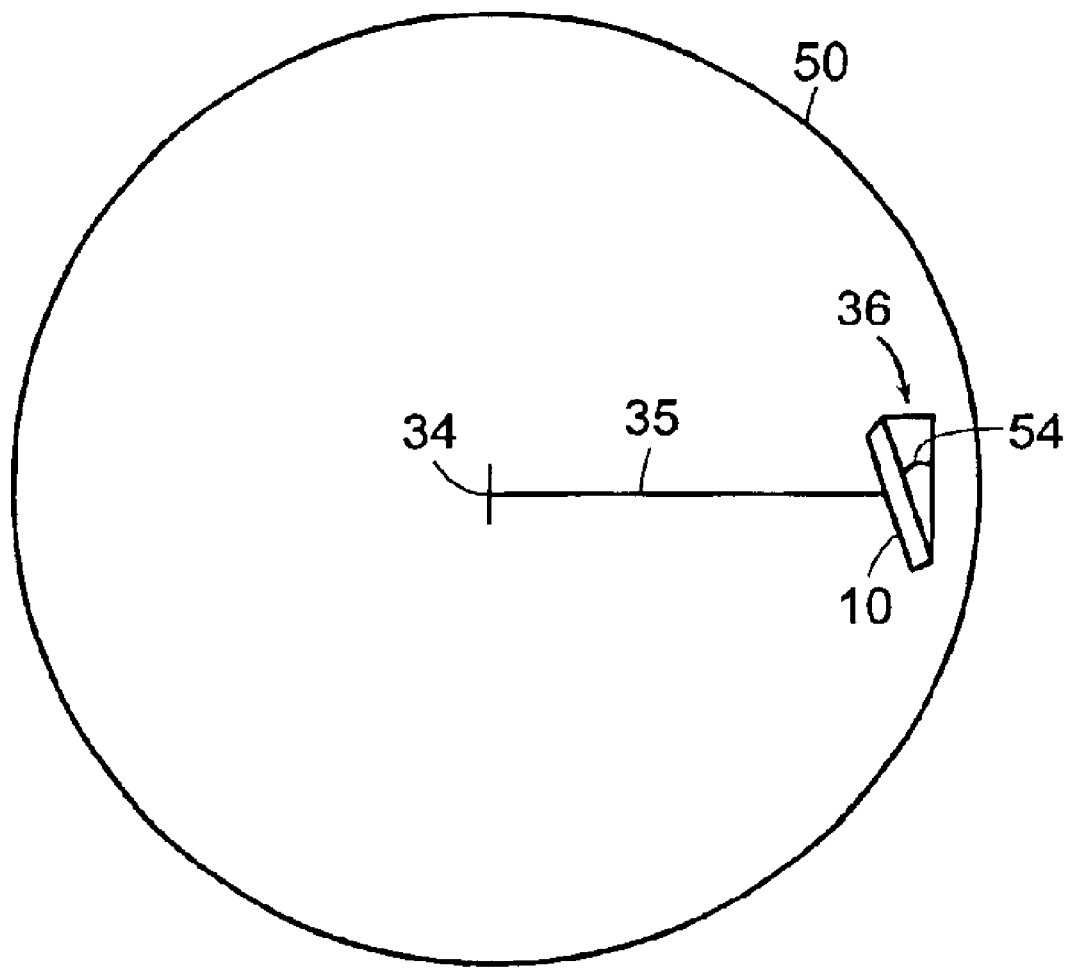
FIG. 10 illustrates a schematic top view of a centrifuge showing a filtration well placed at a side to side angle relative to the line of the centrifuge.

The filtration wells 10 can be placed at an angle within the centrifuge such that there is a top-to-bottom angle 52, a side-to-side angle 54 or a combination top-to-bottom and side-to-side angle of the filtration well plate 10 with respect to the line 35. FIG. 9 illustrates a schematic view of filtration well plate 10 having an angling mechanism 36 which angles the filtration wells 10 at a top-to-bottom angle 52 with respect to line 35. Such an angle can help to increase the amount of average fluid filtered by the wells 18 within the filtration plate 10. FIG. 10 illustrates a schematic top view of a centrifuge having a filtration well 10 with an angling mechanism 36 where the angling mechanism orients the filtration wells at a side-to-side angle 54 relative to the line 35. Again, this angle can help to increase the amount of average fluid filtered in the filtration wells 18.

Figure 11:
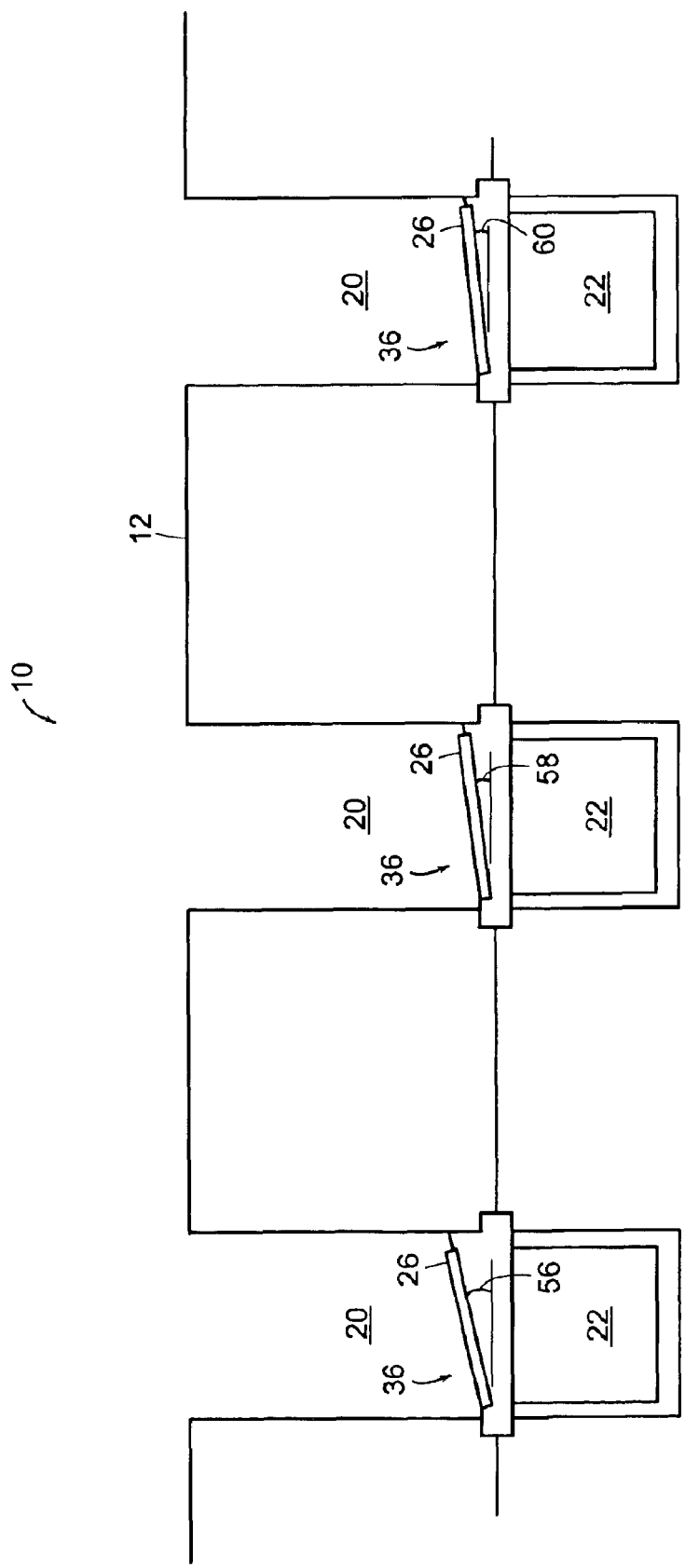
FIG. 11 illustrates a plurality of wells having varying membrane angles.

As an alternate to using a wedge 38 as an angling mechanism 36, the membranes 26 within the wells 18 can be set at individually specified angles relative to the line 35 or relative to the filtration well plate 10. FIG. 11 illustrates plurality of wells 18 within the filtration well plate 10 having membranes 26 angled relative to the well plate 10. The angle of each filter can be set using an angling mechanism 36. The angling mechanism 36 can set each membrane 26 at a non 90° angle relative to the plane of the plate 10. The angle of the membranes 26 can be the same for each well 18. Alternately, the membranes 26 can be set at individual angles. Shown in FIG. 11, each membrane 26 has individual, angle 56, 58 and 60 at which it is set relative to the well plate 10. Such individual angles allow control of the amount of fluid filtered through the filter from the storage chamber into the collection chamber 22. Preferably, the angle of the membrane can be between approximately 5° and 30° degrees relative to the plane of the plate 10. The angle of the membrane can also be between 2° and 30° relative to the plane of the plate. The angle formed relative to the line can have a tolerance of +/−one degree.

Figure 12:
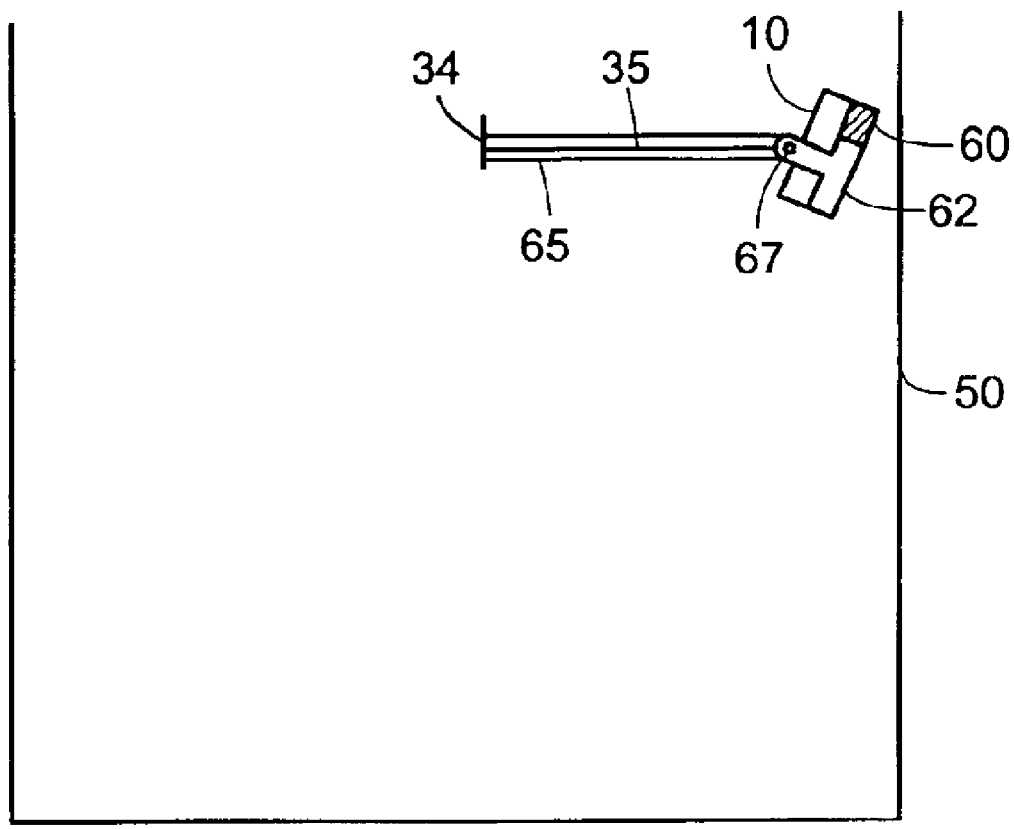
FIG. 12 shows a swinging bucket in a centrifuge having a counterweight.
Figure 13:
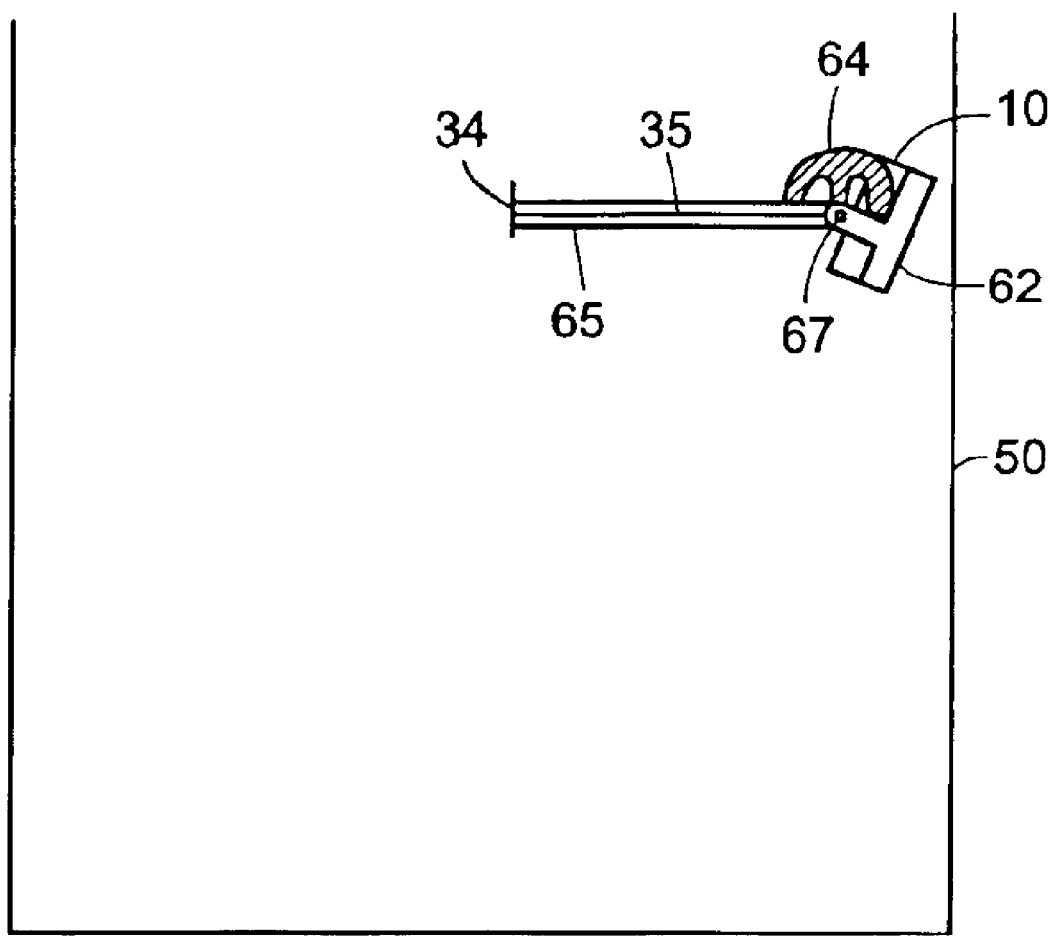
FIG. 13 shows a centrifuge having a stop.

When the centrifuge 50 is in operation, the swinging buckets to which the filtration well plates 10 attach or in which the filtration well plates 10 are placed, rotate about a center of rotation 34 of the centrifuge 50. The centrifuge 50 can include a mechanism to prevent over rotation of the swinging bucket during centrifugation of a fluid and to maintain the filtration wells 18 or the membranes 20 at an angle relative to the swing radius vector. For example, the centrifuge can include a counterweight placed within the swinging bucket to establish an angle of the swinging bucket relative to the center of rotation of a centrifuge. The mechanism can also include a stop 64 to prevent over rotation of the swinging bucket during a centrifuge procedure and to hold the filtration wells plates 10 or the membranes 26 at a fixed angle relative to the line 35 of the centrifuge during a centrifuge procedure as shown in FIGS. 12 and 13. With using the counterweight 60 or stop 64 to maintain the plate at an angle, the plate is placed flat within a swinging bucket 62 of a centrifuge 50. The counterweight 60, FIG. 12, and the stop 64, FIG. 13 maintain the plate 10 at an angle with respect to the line 35, as shown. The swinging bucket 62 can connect to a swinging arm 65 of the centrifuge 50 by a pivot 67. The stop 64 can be located between the swinging bucket 62 and a swing arm 65 of the centrifuge 50 and can also be connected to the pivot 67. The counterweight and the stop can also maintain an angle of the swinging bucket relative to the line 35 during centrifugation of a fluid.

To angle either the plate 10 or the membranes 26 at an angle relative to the line 35 of the centrifuge, the plate can be formed so as to include an angling mechanism integral with the plate. The angled plate can be placed into a centrifuge, without a separate angling mechanism, while producing the same fluid filtration rates and average volumes filtered as a flat plate placed in a centrifuge with an angling mechanism.

Figure 14:
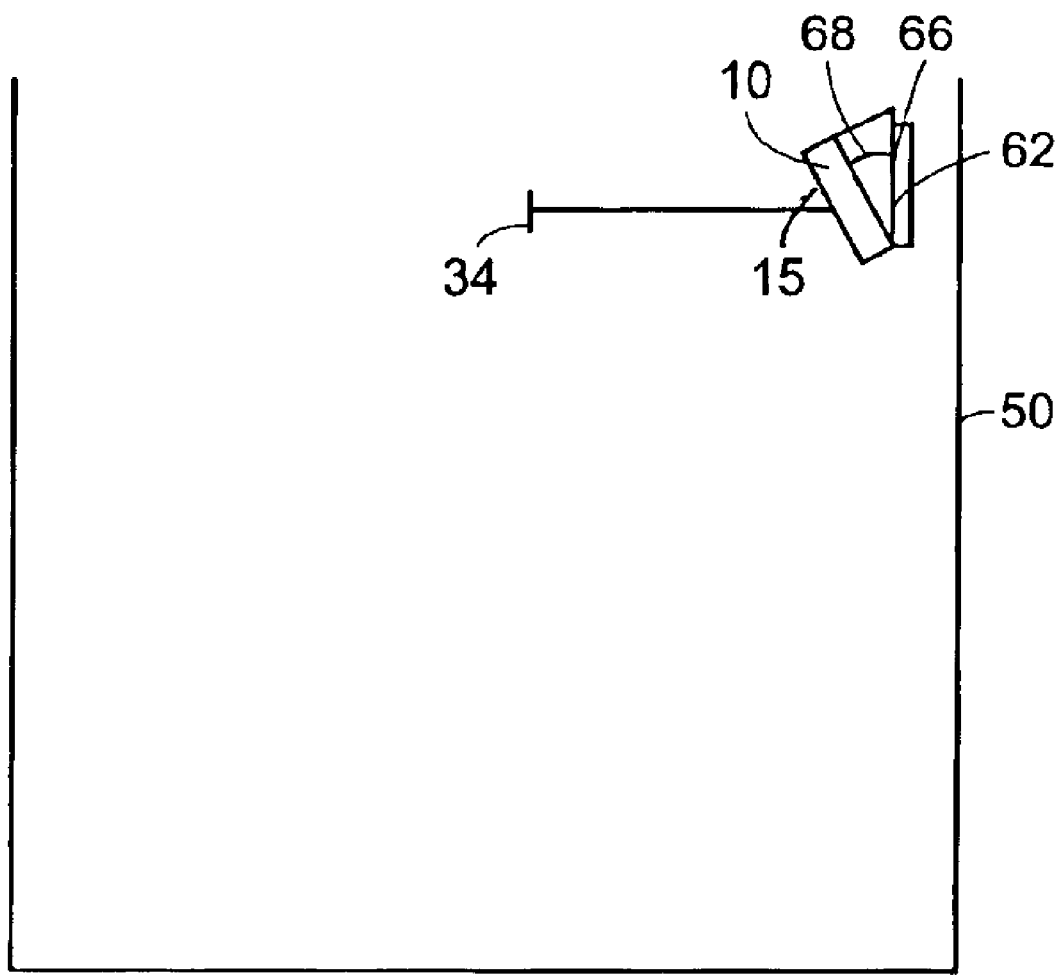
FIG. 14 illustrates a configuration of a filtration well plate mounted in a centrifuge.

In a preferred configuration, illustrated in FIG. 14, the filtration well plate 10 is angled at a top-to-bottom angle with the top of the well plate 10 angled toward the center of rotation 34 of the centrifuge 50. In one configuration, the centrifuge runs for a period of between 30 and 90 minutes at 2,000 to 3,000× gravity for serum or plasma samples or other highly polarizing or boundary layer forming fluids. The plane 15 of the well plate 10 forms an angle 68 of 10 degrees and can form an angle between 5° and 30° or between 2° and 30° with respect to a vertical surface 66, such as the swinging bucket 62. An angling mechanism 36 can be used to angle the well plate 10 ten degrees. A counterweight can be used in the swinging bucket to provide the angle. The plates 10 can be centrifuged at 2,000×g (3,500 RPM) for a period of 60 minutes.

Table 3 illustrates a comparison of the average volume of adult bovine serum filtered for a flat plate and a plate angled within a centrifuge according to the preferred configurations. The average volume is analyzed by row.

TABLE 3

Average Volume in the Filtrate

| | Control 1 | Control 2 | Wedge 3 | Wedge 4 |
|---|---|---|---|---|
| A | 57.3 | 50.9 | 82.6 | 78.3 |
| B | 48.1 | 43.3 | 70.7 | 68.6 |
| C | 38.0 | 33.9 | 61.3 | 57.8 |
| D | 32.0 | 29.2 | 56.6 | 52.1 |
| E | 30.1 | 29.8 | 54.1 | 50.5 |
| F | 33.2 | 33.1 | 63.6 | 54.6 |
| G | 41.6 | 39.3 | 67.9 | 63.3 |
| H | 51.9 | 45.7 | 78.7 | 75.0 |

Figure 15:
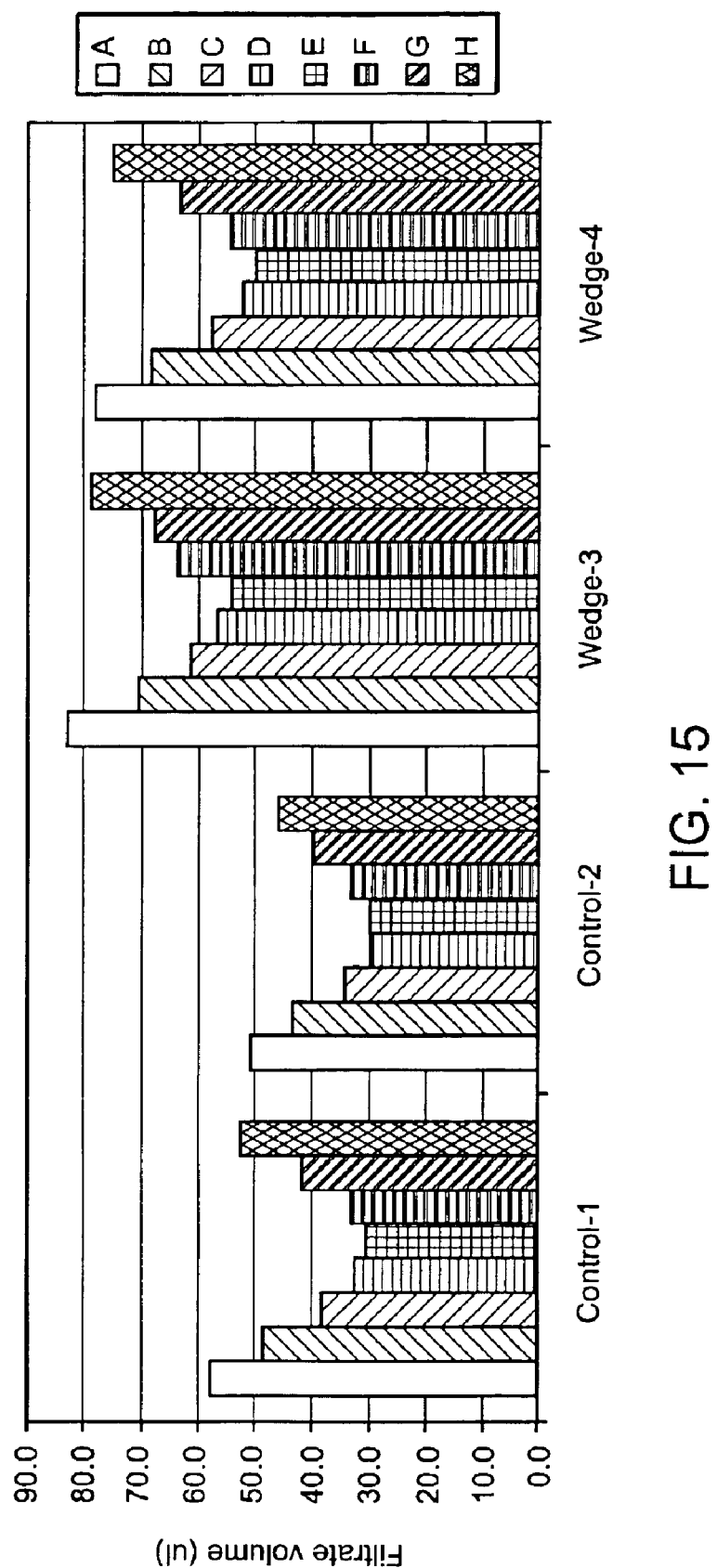
FIGS. 15 and 16 show a comparison of the volume of filtrate filtered by a flat plate and an angled plate, analyzed by row.
Figure 16:
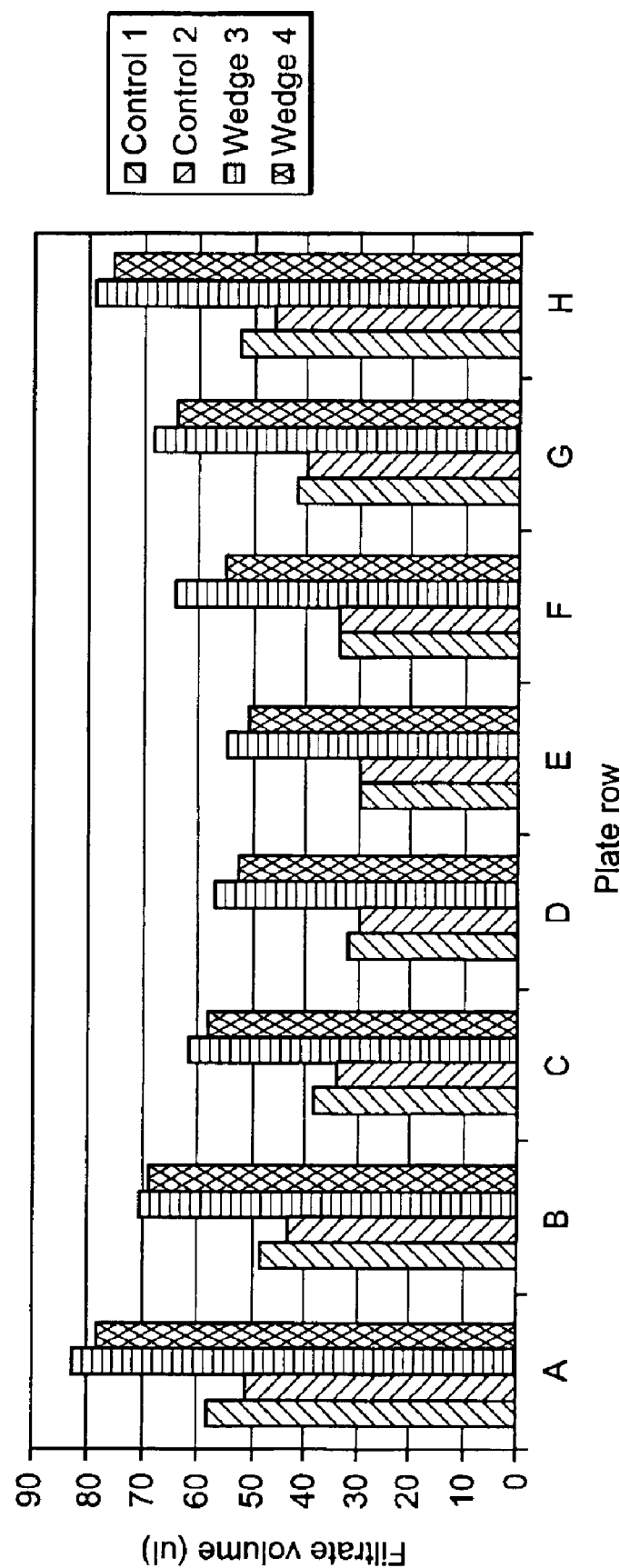

FIGS. 15 and 16 provide a graphical representation of the data presented in Table 3.

Table 4 shows another comparison of the average volume of adult bovine serum filtered for a 96 well flat plate and an angled 96 well plate placed in a centrifuge according to one configuration. In this comparison, the average volume of filtrate collected is analyzed by column.

TABLE 4

Average by Plate Column

| | 1 | 2 | 3 | 4 | 5 | 6 | 7 | 8 | 9 | 10 | 11 | 12 |
|---|---|---|---|---|---|---|---|---|---|---|---|---|
| Control 1 | 46.4 | 44.4 | 43.0 | 42.8 | 40.8 | 40.4 | 38.9 | 38.0 | 38.5 | 40.4 | 41.3 | 43.0 |
| Control 2 | 43.9 | 41.1 | 43.1 | 37.8 | 36.8 | 36.3 | 35.1 | 34.2 | 35.5 | 37.0 | 38.1 | 38.9 |
| Wedge 3 | 66.5 | 67.0 | 68.6 | 67.7 | 68.8 | 66.6 | 67.2 | 65.0 | 66.3 | 65.7 | 71.8 | 62.0 |
| Wedge 4 | 62.9 | 64.3 | 63.9 | 64.4 | 64.1 | 63.1 | 60.4 | 61.8 | 61.8 | 62.5 | 62.9 | 60.0 |

Figure 17:
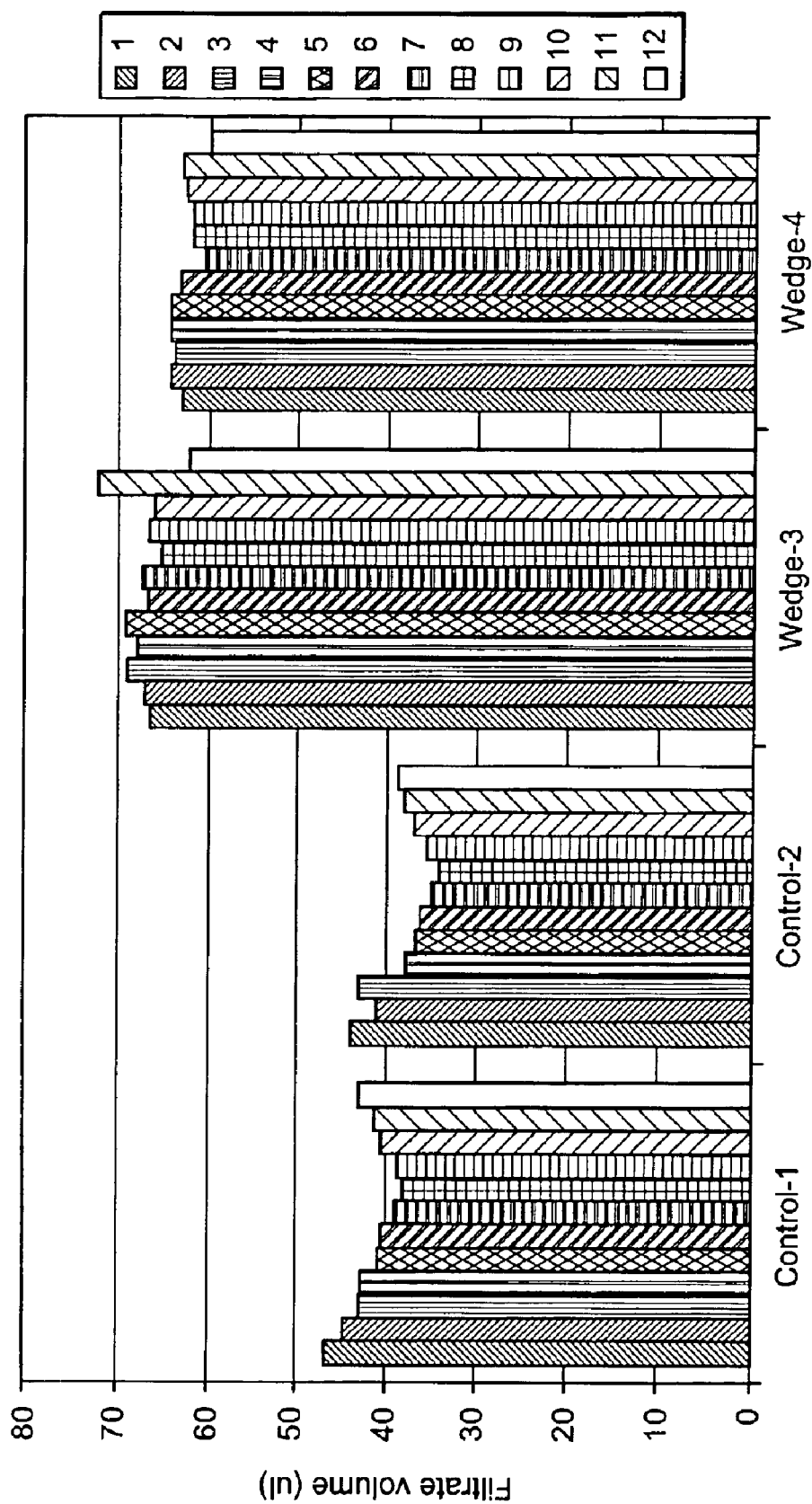
FIGS. 17 and 18 show a comparison of the volume of filtrate filtered by a flat plat and an angled plate, analyzed by column.
Figure 18:
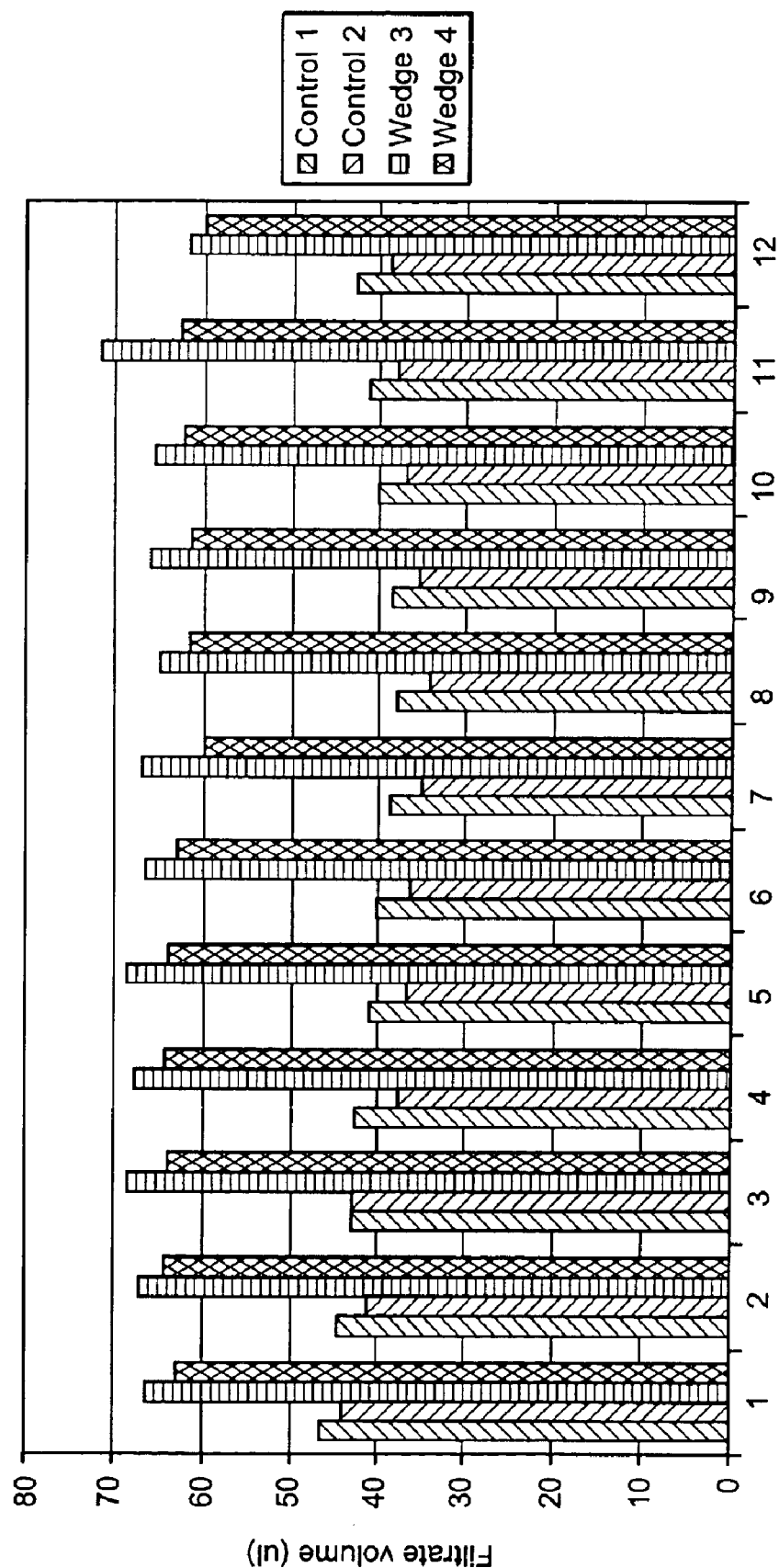

FIGS. 17 and 18 illustrate a graphical representation of this data. As shown, the use of an angled plate in the configuration described provides a greater amount of filtrate filtered by the plate as compared to that filtered by the flat plate. Furthermore, use of the angling configuration provides a uniform volume of fluid filtered by column, compared to the amount filtered by the flat plate.

Table 5 shows the average volumes of fluid filtered by the angled plate using the preferred configuration and the flat plate. The angled plates provided a higher average volume of fluid filtered as compared to the flat plates.

TABLE 5

| 60 min @ 2,800 g (Beckman Centrifuge) | | | |
|---|---|---|---|
| | Average/plate | Lowest value | Highest value |
| Control 1 | 41.5 µl | 25.6 µl | 64.5 µl |
| Control 2 | 38.2 µl | 24.9 µl | 59.4 µl |
| Wedge 3 | 66.9 µl | 49.2 µl | 87.0 µl |
| Wedge 4 | 62.7 µl | 44.4 µl | 80.8 µl |

While this invention has been particularly shown and described with references to preferred embodiments thereof, it will be understood by those skilled in the art that various changes in form and details may be made therein without departing from the scope of the invention encompassed by the appended claims.

What is claimed is:

1. A fluid filtering device comprising:
   a) a plurality of filtering wells within a plate wherein each filtering well includes a flat membrane at the bottom of a storage chamber for processing a fluid and wherein the flat membrane is essentially horizontal with respect to the plane of the plate; and
   b) an angling mechanism, wherein the angling mechanism sets the angle of the flat membranes within the plurality of filtering wells at a non 90° angle relative to a line perpendicular to an axis of rotation about which the plate rotates, the line passing through the center of a plane of the plate.

2. The device of claim 1 wherein the angling mechanism includes a support device which can hold the flat membrane for filtering a fluid at a non 90° angle relative to the line.

3. The device of claim 2 wherein the angling mechanism includes a wedge.

4. The device of claim 1 wherein the planes of the flat membranes are at an angle in the range of between 85° and 60° relative to the line.

5. The device of claim 1 wherein the flat membrane includes a microfiltration membrane.

6. The device of claim 1 wherein the flat membrane includes an ultrafiltration membrane.

7. The device of claim 1 wherein said wells are arranged in rows and columns.

8. The device of claim 7 wherein the angles of the flat membranes within a row are substantially the same.

9. The device of claim 1 wherein the angling mechanism has an angle between 5° and 30°.

10. The device of claim 1 wherein the plurality of wells includes at least 96 wells.

11. The device of claim 1 wherein the angling mechanism has an angle between 2° and 30°.

12. The device of claim 1 wherein the plurality of wells includes at least six wells.

13. The device of claim 1 wherein the plurality of wells includes at least twelve wells.

14. A fluid filtering device comprising:
   a) a plurality of wells within a plate wherein each well includes a flat membrane at the bottom of a storage chamber for filtering a fluid, wherein at least three membranes in the plurality of wells are at different angles with respect to a major plane of the plate; and
   b) an angling mechanism wherein the angling mechanism sets the angle of at least three of the flat membranes at a non-zero angle relative to the major plane of the plate.

15. The device of claim 14 wherein the angle relative to the plane of the plate includes a side-to-side orientation of the flat membrane.

16. The device of claim 14 wherein the filtering wells are located in an array in the same plane.

17. The device of claim 14 wherein each flat membrane in each well includes an individually specified angle relative to the plane of the plate.

18. The device of claim 14 wherein the angling mechanism includes a support device which can hold the flat membrane for filtering a fluid at a non zero-angle relative to the plane of the plate.

19. The device of claim 14 wherein the angling mechanism includes a wedge.

20. The device of claim 14 further comprising a centrifuge and a swinging bucket attached to the centrifuge, wherein the plate is positioned within the bucket and the angling mechanism is placed between the center of rotation and a base of the swinging bucket.

21. The device of claim 14 wherein each of the plurality of wells includes the angling mechanism.

22. The device of claim 21 wherein each angling mechanism in each well includes an individually specified angle relative to the major plane of the plate.

23. The device of claim 14 wherein all of the flat membranes are at a non-zero angle relative to the plane of the plate.

24. The device of claim 14 wherein the flat membrane includes a microfiltration membrane.

25. The device of claim 14 wherein the flat membrane includes an ultrafiltration membrane.

26. The device of claim 14 wherein said wells are arranged in rows and columns.

27. The device of claim 26 wherein the angles of the flat membranes within a row are substantially the same.

28. The device of claim 14 wherein the angling mechanism has an angle between 5° and 30°.

29. The device of claim 14 wherein the plurality of wells includes at least 96 wells.

30. The device of claim 14 wherein the device is a filtration well plate located in a centrifuge.

31. The device of claim 14 wherein the angling mechanism has an angle between 2° and 30°.

32. The device of claim 14 wherein the plurality of wells includes at least three wells.

33. The device of claim 14 wherein the plurality of wells includes at least twelve wells.

34. A fluid filtering device comprising:
   a) a plurality of filtering wells within a plate, each well including a membrane for processing a fluid, the membranes being coplanar with the plate and wherein the membranes are essentially horizontal with respect to the plane of the plate; and
   b) an angling mechanism that sets the angle of the membranes within the plurality of filtering wells at a non 90° angle relative to a line perpendicular to an axis of rotation about which the plate rotates, the line passing through the center of a plane of the plate.

35. The device of claim 34 wherein the angling mechanism includes a support device which can hold the flat membrane for filtering a fluid at a non 90° angle relative to the line.

36. The device of claim 35 wherein the angling mechanism includes a wedge.

37. The device of claim 34 wherein the angling mechanism is located outside of the plate.

38. A fluid filtering device comprising:
a) a plurality of filtering wells within a plate, each well including a flat membrane at the bottom of a storage chamber for processing a fluid; and
b) an angling mechanism that sets the angle of the flat membranes at a respective non-zero angle relative to the plane of the plate, the respective angles decreasing as the position of the respective wells increases relative to a line perpendicular to an axis of rotation about which the plate rotates, the line passing through the center of a plane of the plate.

* * * * *